US 12,215,629 B2

(12) United States Patent
Glessner et al.

(10) Patent No.: US 12,215,629 B2
(45) Date of Patent: Feb. 4, 2025

(54) TURBINE ENGINE INCLUDING TRANSFER GEARBOX AND ACCESSORY GEARBOX

(71) Applicant: GENERAL ELECTRIC COMPANY, Schenectady, NY (US)

(72) Inventors: John Carl Glessner, Kings Mills, OH (US); John Robert Holland, West Chester, OH (US); Efren Souza Chavez, Queretaro (MX); Ethan Patrick O'Connor, Hamilton, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/184,937

(22) Filed: Mar. 16, 2023

(65) Prior Publication Data

US 2024/0263586 A1  Aug. 8, 2024

Related U.S. Application Data

(60) Provisional application No. 63/443,542, filed on Feb. 6, 2023.

(51) Int. Cl.
*F02C 7/32* (2006.01)
*F02C 7/36* (2006.01)

(52) U.S. Cl.
CPC ............ *F02C 7/32* (2013.01); *F02C 7/36* (2013.01); *F05D 2220/32* (2013.01); *F05D 2220/76* (2013.01); *F05D 2260/40* (2013.01)

(58) Field of Classification Search
CPC ...................................................... F02C 7/32
See application file for complete search history.

(56) References Cited

U.S. PATENT DOCUMENTS

| | | | |
|---|---|---|---|
| 2,951,395 A | 9/1960 | Smith | |
| 2,978,209 A | 4/1961 | Henry | |
| 3,543,588 A | 12/1970 | Richardson | |
| 3,638,421 A | 2/1972 | Chilman | |
| 3,722,214 A * | 3/1973 | Guillot | F02C 7/105 |
| | | | 60/39.512 |
| 7,805,947 B2 | 10/2010 | Moulebhar | |
| 8,074,455 B2 | 12/2011 | Pierrot et al. | |
| 9,297,314 B2 | 3/2016 | Cloft et al. | |
| 9,689,314 B2 | 6/2017 | Lemarchand et al. | |
| 9,938,850 B2 | 4/2018 | Edwards et al. | |
| 10,184,404 B2 | 1/2019 | Cloft et al. | |
| 10,308,366 B2 | 6/2019 | Kupiszewski et al. | |
| 10,336,461 B2 | 7/2019 | Mackin | |

(Continued)

FOREIGN PATENT DOCUMENTS

| | | |
|---|---|---|
| FR | 2994585 A1 | 2/2014 |
| GB | 839961 | 6/1960 |
| WO | 2015/134081 A3 | 9/2015 |

*Primary Examiner* — David P. Olynick
(74) *Attorney, Agent, or Firm* — McGarry Bair PC

(57) ABSTRACT

A turbine engine having an engine core that includes a compressor section, a combustion section, and a turbine section. An inner cowl circumscribes the engine core and an outer cowl radially spaced from the inner cowl, circumscribes at least a portion of the inner cowl. A transfer gearbox, at least partially located within an inner cowl space between the engine core and the inner cowl, operably couples to a first accessory device. An accessory gearbox located in the outer cowl operably couples to the transfer gearbox and a second accessory device.

20 Claims, 8 Drawing Sheets

(56) References Cited

U.S. PATENT DOCUMENTS

| | | | |
|---|---|---|---|
| 10,731,566 | B2 | 8/2020 | Alstad et al. |
| 10,823,080 | B2 * | 11/2020 | Wotzak .................... F02C 7/32 |
| 11,022,042 | B2 | 6/2021 | Munevar |
| 11,081,917 | B2 | 8/2021 | Torrey et al. |
| 11,319,882 | B2 | 5/2022 | Kupratis et al. |
| 11,326,467 | B2 | 5/2022 | Kupratis et al. |
| 2004/0065091 | A1 | 4/2004 | Anderson |
| 2006/0101804 | A1 | 5/2006 | Stretton |
| 2006/0248900 | A1 | 11/2006 | Suciu et al. |
| 2009/0188334 | A1 | 7/2009 | Merry et al. |
| 2010/0107650 | A1 | 5/2010 | Ress, Jr. et al. |
| 2011/0154827 | A1 | 6/2011 | Ress, Jr. et al. |
| 2013/0098058 | A1 * | 4/2013 | Sheridan ................ F01D 25/18 60/783 |
| 2014/0090386 | A1 * | 4/2014 | Cloft ........................ F02C 7/32 60/801 |
| 2015/0233300 | A1 | 8/2015 | Cloft et al. |
| 2016/0146111 | A1 | 5/2016 | Prunera-Usach et al. |
| 2016/0186598 | A1 | 6/2016 | Cloft et al. |
| 2016/0245183 | A1 | 8/2016 | Viel et al. |
| 2016/0281605 | A1 | 9/2016 | Snecma |
| 2017/0122122 | A1 | 5/2017 | Lepretre |
| 2019/0048801 | A1 | 2/2019 | Guillemont et al. |
| 2021/0404386 | A1 | 12/2021 | Venter et al. |
| 2021/0404387 | A1 | 12/2021 | Venter et al. |

* cited by examiner

TURBINE ENGINE INCLUDING TRANSFER GEARBOX AND ACCESSORY GEARBOX

CROSS-REFERENCE TO RELATED APPLICATION

This application claims priority to U.S. Provisional Application Ser. No. 63/443,542, filed Feb. 6, 2023, the contents of which are incorporated herein by reference.

TECHNICAL FIELD

This disclosure relates to a turbine engine, and more specifically, to a turbine engine including a transfer gearbox and an accessory gearbox.

BACKGROUND

Gas turbine engines often include an accessory gearbox to power or drive accessory systems such as fuel pumps, lubrication pumps, air compressors, scavenge pumps, electrical generators, hydraulic pumps, etc. The accessory gearbox can be driven by one or more components of the gas turbine engine. When powered or mechanically driven by the gas turbine engine, the accessory gearbox can interface with the accessory systems that require different rotational input, torque, or horsepower.

BRIEF DESCRIPTION OF THE DRAWINGS

A full and enabling disclosure, including the best mode thereof, directed to one of ordinary skill in the art, is set forth in the specification, which refers to the appended figures in which.

In the drawings.

DETAILED DESCRIPTION

Figure 1:
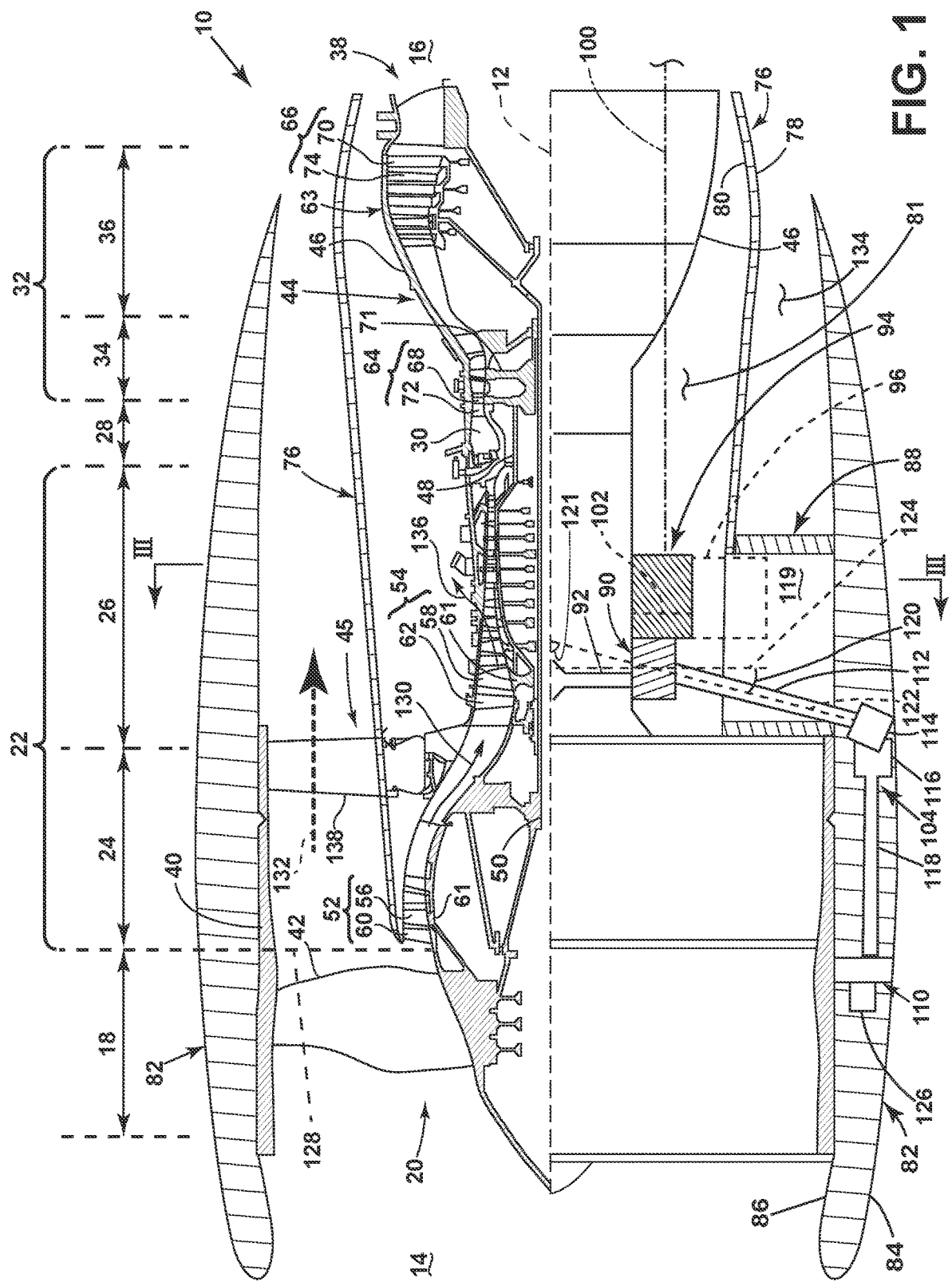
FIG. 1 is a schematic view of a turbine engine with a partial sectional cutaway along a turbine engine axis of rotation illustrating a transfer gearbox, an accessory gearbox, and a connecting assembly in the lower half, according to aspects of the present disclosure.

One or more aspects described herein provide an accessory gearbox (AGB), a transfer gearbox (TGB), and first and second accessory devices within a turbine engine. The TGB can receive a rotation output from a drive shaft within the turbine engine. The TGB and the first accessory device, operably coupled to the TGB, are located within an inner cowl space. The AGB and the second accessory, operably coupled to the AGB, are located within an outer cowl. A connecting assembly couples the AGB to the TGB, such that the TGB provides rotational output received by the AGB.

Traditionally, the first and second accessories are located in the outer cowl and operably couped to the AGB. However, accessory size in the outer cowl changes the possible aerodynamic line of the outer cowl. This in turn effects the size and shape of the inner cowl. By moving, an accessory, illustrated as the first accessory, into the inner cowl space and operably coupling it to the TGB, the shape and therefore the aerodynamics of the outer cowl can be improved. Improved aerodynamics (thinner outer cowl) of the turbine engine increases fuel efficiency.

The first accessory device can be, for example, an electrical generator. As technology advances, there is an increased need for electrical power in aircraft. For example, passengers in a fuselage of an aircraft may want to use an electrical device mounted in the aircraft, use a personal electronic device, or charge personal electronic devices. As the need for more electrical power increases, often the size of the electrical generator increases to meet those needs.

For purposes of illustration, the present disclosure will be described with respect to a turbine engine for an aircraft. The disclosure can have applicability in a variety of vehicles or engines, and can be used to provide benefits in industrial, commercial, and residential applications. Further non-limiting examples of other vehicles or engines to which the disclosure can relate can include boats, helicopters, cars, or other aquatic, air, space, or land vehicles. Industrial, commercial, or residential applications of the disclosure can include, but are not limited to, marine power plants, wind turbines, or small power plants.

As used herein, the terms "first" and "second" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "radial" or "radially" refer to a direction away from a common center. For example, in the overall context of a turbine engine, radial refers to a direction along a ray extending between a center longitudinal axis of the engine (turbine engine axis of rotation) and an outer engine circumference.

Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate structural elements between a collection of elements and relative movement between elements unless otherwise indicated. As such, connection references do not necessarily infer that two elements are directly connected and in fixed relation to one another.

The drawings are for purposes of illustration only and the dimensions, positions, order and relative sizes reflected in the drawings attached hereto can vary.

As used herein, the term "transfer gearbox (TGB)" refers to a gearbox having a rotational input from a shaft rotation within a core of a turbine engine and a rotational output provided to another gearbox axially or radially spaced from the TGB. The other gearbox to which the TGB operably couples can be, for example, an accessory gearbox. The TGB can also provide a rotational output to drive one or more accessories, while also providing a rotational output to one or more gearboxes.

As used herein, the term "accessory gearbox (AGB)" refers to a gearbox that receives rotational input from a connecting system between the TGB and the AGB or a rotating shaft in the engine core of a turbine engine. The AGB provides an output to accessories such as, but not limited to, engine accessories or aircraft accessories. In other words, an AGB provides output to only accessories, whereas the TGB provides rotational output to at least another gearbox.

FIG. 1 is a schematic partial section view of a turbine engine 10 for an aircraft, where an upper section of FIG. 1 illustrates the cross section of the turbine engine 10 and a lower section illustrates a schematic of static support structures, an accessory gearbox, a transfer gearbox, accessory devices, and a connection assembly that couples the accessory gearbox to the transfer gearbox.

The turbine engine 10 has a centerline or turbine engine axis of rotation 12 extending forward 14 to aft 16. The turbine engine 10 includes, in axial flow arrangement, a fan section 18 including a fan assembly 20, a compressor section 22 including a booster or low-pressure (LP) compressor 24 and a high-pressure (HP) compressor 26, a combustion section 28 including a combustor 30, a turbine section 32 including an HP turbine 34, and an LP turbine 36, and an exhaust section 38.

The fan section 18 includes a fan casing 40 surrounding the fan assembly 20. The fan assembly 20 includes a plurality of fan blades 42 disposed radially about the turbine engine axis of rotation 12. The compressor section 22, the combustor 30, and the turbine section 32 form a core illustrated as engine core 44, which generates combustion gases. The engine core 44 is surrounded by a core casing 46, which can be coupled with the fan casing 40.

An outlet guide vane assembly 45 is located downstream of the fan blades 42. The outlet guide vane assembly 45 can be located in the fan section 18, the LP compressor 24, or axially span a portion of the fan section 18 and a portion of the LP compressor 24.

An HP shaft or HP spool 48 disposed coaxially about the turbine engine axis of rotation 12 of the turbine engine 10 drivingly connects the HP turbine 34 to the HP compressor 26. An LP shaft or LP spool 50, which is disposed coaxially about the turbine engine axis of rotation 12 of the turbine engine 10 within the larger diameter annular HP spool 48, drivingly connects the LP turbine 36 to the LP compressor 24 and fan assembly 20. The HP spool 48 and LP spool 50 are rotatable about the turbine engine axis of rotation 12 and couple to a plurality of rotatable elements, which can collectively define an inner rotor/stator. While illustrated as a rotor, it is contemplated that the inner rotor/stator can be a stator.

The LP compressor 24 and the HP compressor 26 respectively include a plurality of compressor stages 52, 54, in which a set of compressor blades 56, 58 rotate relative to a corresponding set of static compressor vanes 60, 62, which can also be called a nozzle, to compress or pressurize the stream of fluid passing through the stage. In a single compressor stage 52, 54, multiple compressor blades 56, 58 can be provided in a ring and can extend radially outwardly relative to the turbine engine axis of rotation 12, from a blade platform to a blade tip, while the corresponding static compressor vanes 60, 62 are positioned upstream of and adjacent to the rotating compressor blades 56, 58. It is noted that the number of blades, vanes, and compressor stages shown in FIG. 1 were selected for illustrative purposes only, and that other numbers are possible.

The compressor blades 56, 58 for a stage of the compressor can be mounted to a disk 61, which is mounted to the corresponding one of the HP spool 48 and LP spool 50, with each stage having its own disk 61. The vanes 60, 62 for a stage of the compressor section 22 can be mounted to the core casing 46 in a circumferential arrangement.

The HP turbine 34 and the LP turbine 36, respectively, include a plurality of turbine stages 64, 66, in which a set of turbine blades 68, 70 are rotated relative to a corresponding set of static turbine vanes 72, 74, which can also be called a nozzle, to extract energy from the stream of fluid passing through the stage. In a single turbine stage 64, 66, multiple turbine blades 68, 70 can be provided in a ring and can extend radially outwardly relative to the turbine engine axis of rotation 12, from a blade platform to a blade tip, while the corresponding static turbine vanes 72, 74 are positioned upstream of and adjacent to the rotating turbine blades 68, 70. It is noted that the number of blades, vanes, and turbine stages shown in FIG. 1 were selected for illustrative purposes only, and that other numbers are possible.

The turbine blades 68, 70 for a stage of the turbine section 32 can be mounted to a disk 71, which is mounted to the corresponding one of the HP spool 48 and LP spool, 50, with each stage having a dedicated disk 71. The turbine vanes 72, 74 for a stage of the turbine section 22 can be mounted to the core casing 46 in a circumferential arrangement.

Complementary to the rotor portion, the stationary portions of the turbine engine 10, such as the static compressor vanes 60, 62, and the static turbine vanes 72, 74 among the compressor and turbine sections 22, 32 are also referred to individually or collectively as a stator 63. As such, the stator 63 can refer to the combination of non-rotating elements throughout the turbine engine 10.

An inner cowl 76 is radially spaced from the engine core 44 and can circumscribe at least a portion of the engine core 44. The inner cowl 76 can include an outside face 78 and an inside face 80, where the inside face 80 of the inner cowl 76 can confront the engine core 44 or the core casing 46.

An inner cowl space 81 is defined between at least a portion of the engine core 44 and the inner cowl 76. More specifically, the inner cowl space 81 is the region or space between the core casing 46 and the inside face 80 of the inner cowl 76.

A nacelle or outer cowl 82 is radially spaced from the inner cowl 76 and can circumscribe at least a portion of the inner cowl 76. The outer cowl 82 has a radially outer surface 84 and a radially inner surface 86, where the inner surface 86 confronts the outside face 78 of the inner cowl 76. The outer cowl 82 can support or define the fan casing 40.

A fairing or a strut 88 extends radially from the inner cowl 76 to the outer cowl 82. The strut 88 can be located in the compressor section 22. It is contemplated, however, that a portion of the strut 88 can extend into the fan section 18 or the combustion section 28. The strut 88 is located downstream of the outlet guide vane assembly 45. The strut 88 connects or couples the inner cowl 76 and the outer cowl 82. More specifically, the strut 88 can couple the inner cowl space 81 with a region between the outer surface 84 and inner surface 86 of the outer cowl 82. In other words, the strut 88 can be a faired passageway between the inner cowl 76 and outer cowl 82 which radially extends or spans a bifurcated airflow between the inner cowl 76 and outer cowl 82.

A transfer gearbox (TGB) 90 is located radially between the core casing 46 and the inner cowl 76 in the inner cowl space 81. The TGB 90 is axially located upstream of the combustion section 28 and downstream of the fan section 18, the LP compressor 24, or the outlet guide vane assembly 45. One or more shafts 92 and one or more gears (not shown) can operably couple the TGB 90 to the HP spool 48 or the LP spool 50.

A first accessory device 94 couples to the TGB 90. The first accessory device 94 can be located radially between the core casing 46 and the inner cowl 76, however, it is contemplated that a lower portion 96 of the first accessory device 94 can extend radially past the inner cowl 76.

The first accessory device 94 is located upstream of the combustion section 28. Locating both the first accessory device 94 and the TGB 90 upstream of the combustion section 28 provides temperature benefits.

As illustrated, by way of example, the first accessory device 94 is axially downstream of the TGB 90. Alternatively, it is contemplated that the first accessory device 94 can be radially offset and axially align with at least a portion of the TGB 90. In yet another different and non-limiting example, the first accessory device 94 can extend or be located upstream of the TGB 90.

Alternatively, it is further contemplated in a differing and non-limiting example, that the first accessory device 94 can be a set of first accessory devices that can include aircraft accessories, engine accessories, or a combination therein. The set of first accessory devices are located upstream of the combustion section 28 and can be located downstream, upstream, or at least partially axially align with the TGB 90. For example, the set of first accessory devices can include three accessory devices where one accessory device is located downstream of the TGB 90 and the other two accessory devices axially align with the TGB 90 and are located circumferentially on either side of the TGB 90.

The first accessory device 94 is illustrated, by way of example, as an aircraft accessory having communication with an aircraft (FIG. 8) illustrated by communication line 100. More specifically, the first accessory device 94 is illustrated, by way of example, as an electrical generator. The electrical generator can be, by way of non-limiting example, a variable frequency generator.

As used herein, the term "aircraft accessory" refers to an accessory that can interface with components outside of the turbine engine 10, once the turbine engine 10 is self-sustaining. Optionally, aircraft accessory can contribute to the operation of the turbine engine 10 in addition to interfacing with one or more components outside of the turbine engine 10. Non-limiting examples of aircraft accessories include an electrical generator, a hydraulic pump, an aircraft permanent magnet alternator, or an air turbine starter. Further non-limiting examples can include a primary lubrication pump, secondary lubrication pump, main fuel pump, fuel boost pump, or rotisserie.

Alternatively, it is contemplated that in a differing and non-limiting example, that the first accessory device 94 can be an engine accessory. As used herein, the term "engine accessory" refers to an accessory that only contributes to the operation of the turbine engine 10. Non-limiting examples of engine accessories include a fuel pump, main fuel pump, fuel boost pump, lubrication pump, primary lubrication pump, secondary lubrication pump, air compressor, starter, air turbine starter, scavenge pump, fuel control, rotisserie, or permanent magnet alternator.

Optionally, a transition region 102 between the first accessory device 94 or the TGB 90 can include at least one gear and one shaft that directly couple the TGB 90 to the first accessory device 94. In other words, the first accessory device 94 is directly driven or directly coupled to the TGB 90 and an accessory gearbox is not required between the first accessory device 94 and the TGB 90.

A connection assembly 104 operably couples the TGB 90 to an accessory gearbox (AGB) 110. The connection assembly 104 includes at least a first transfer shaft 112, a first interface 114, a second interface 116, and a second transfer shaft 118. The first transfer shaft 112 can extend radially from the TGB 90 toward the outer cowl 82. The strut 88 has a hollow interior 119, where the first transfer shaft 112 can pass through the strut 88.

It is contemplated that the TGB 90 can include at least one bevel gear. It is further contemplated that the first transfer shaft 112 can be driven by the bevel gear in the TGB 90.

A first angle 121 can be defined by the angle between a first shaft centerline 122 and the turbine engine axis of rotation 12 when viewed from a plane containing both the first shaft centerline 122 and the turbine engine axis of rotation 12. While the first angle 121 can be any angle measure, it is contemplated that the first angle 121 is a non-zero angle. Further, it is contemplated the first angle is greater than 0° and less than 90°.

A first shaft angle 120 can be defined by the angle between the first shaft centerline 122 and a radius 124 perpendicular to the turbine engine axis of rotation 12 and intersecting the first shaft centerline 122 at the TGB 90. While the first shaft angle 120 can be any angle measure, it is contemplated that the first shaft angle 120 is a non-zero angle. Further, it is contemplated the first shaft angle 120 is greater than 0° and less than 90°. That is, the first transfer shaft 112 extends radially away from the TGB 90 and is angled in an upstream direction.

The first interface 114 couples to the first transfer shaft 112. The first interface 114 is located in the outer cowl 82 and receives rotational energy from the first transfer shaft 112. The first interface 114 can be a gear, a set of gears, or any other known design to transfer rotational energy to the second interface 116 or the second transfer shaft 118. By way of non-limiting example, the first interface 114 and the second interface 116 can define a bevel gear. It is also contemplated that additional components can be added to couple the first interface 114 to the second interface 116.

Figure 3:
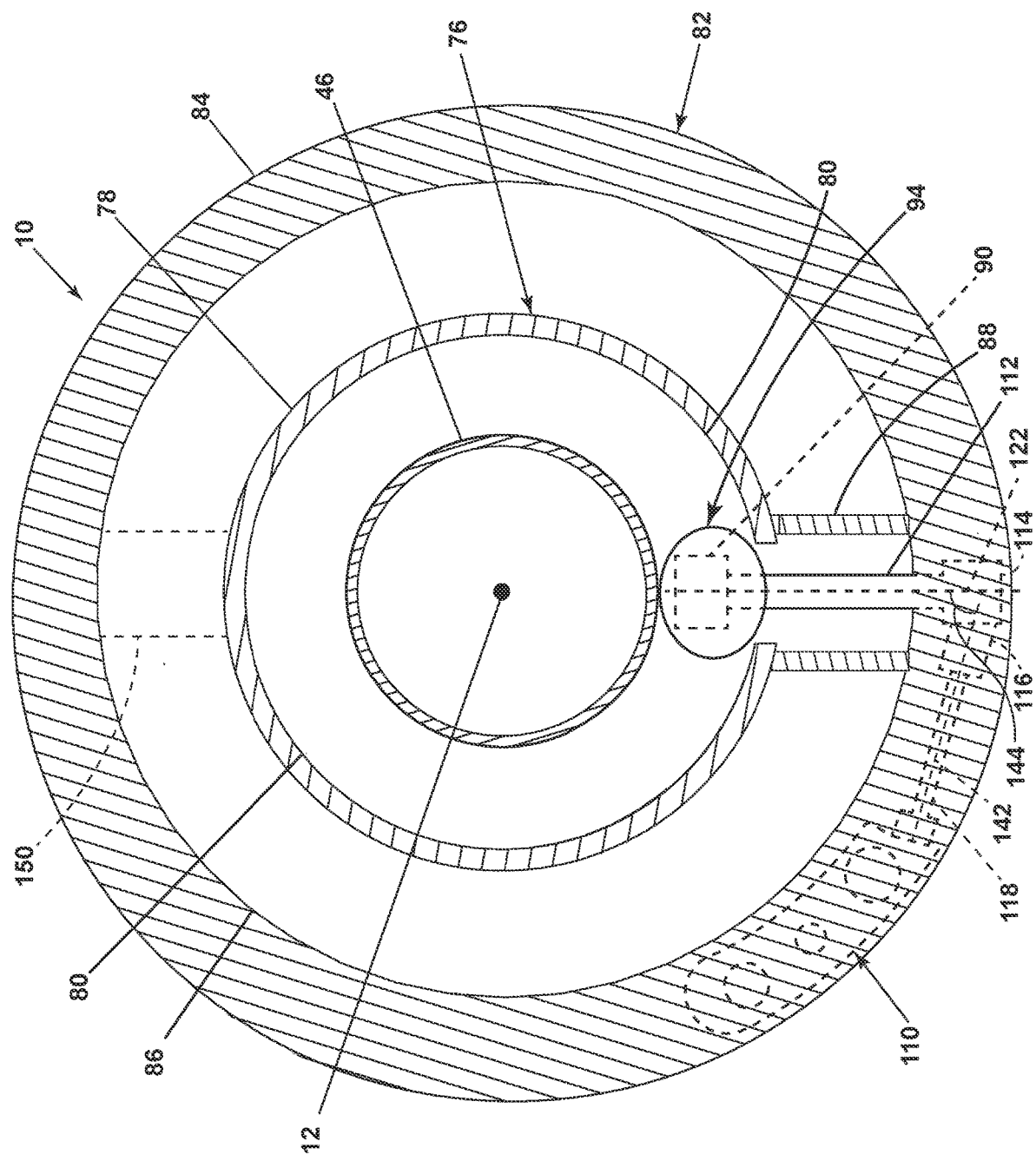
FIG. 3 illustrates a schematic cross section taken at the transfer gearbox of FIG. 1 along line III-III, in the context of selected support structures, according to aspects of the present disclosure.

The second interface 116 receives rotational energy from the first interface 114 and is operably coupled to the second transfer shaft 118. The second transfer shaft 118 rotates with the second interface 116. The second transfer shaft 118 couples to the AGB 110 located upstream of the TGB 90. While illustrated, by way of example, as extending upstream, the second transfer shaft 118 can extend circumferentially about the outer cowl 82 as illustrated in FIG. 3.

While illustrated as located in the inner cowl space 81, it is contemplated that the TGB 90 can be partially located or completely located within the strut 88. It is further contemplated that one or more of the first interface 114 or the second interface 116 can be located partially or completely within the strut 88.

The AGB 110 is coupled to the second transfer shaft 118 and receives rotational energy. The AGB 110 is located upstream of the combustion section 28. However, as illustrated by way of example, the AGB 110 can be located upstream of the HP compressor section 22. That is, the AGB 110 can be located in the fan section 18, axially adjacent an upstream portion of the LP compressor 24, or combination thereof.

A second accessory device 126 couples to the AGB 110. The second accessory device 126 is located upstream of the combustion section 28. The second accessory device 126 can also be upstream of the strut 88 or upstream of at least a portion of the outlet guide vane assembly 45. That is, one or more portions of the second accessory device 126 can be located in the fan section 18, axially adjacent an upstream portion of the LP compressor 24, or combination thereof. Having the AGB 110 or the second accessory device 126 upstream the combustion section 28 and radially spaced from the engine core 44 provides a cooler environment than a radially or axially location closer to the combustion section 28.

The second accessory device 126 is located in the outer cowl 82. As illustrated, by way of example, the second accessory device 126 is axially upstream of the AGB 110. Alternatively, it is contemplated that the second accessory device 126 can be radially offset and axially align with at least a portion of the AGB 110. In yet another different and non-limiting example, the second accessory device 126 can extend or be located downstream of the TGB 90. That is, the second accessory device 126 can extend from any one or more portions of the AGB 110 in any radial, axial, or circumferential arrangement such that the AGB 110 provides an output to the second accessory device 126 in the outer cowl 82. It is also contemplated that the second accessory device 126 can axially overlap at least a portion of the fan blades 42.

Alternatively, it is further contemplated in a differing and non-limiting example, that the second accessory device 126 can be a set of second accessory devices (see FIG. 2) that can include aircraft accessories, engine accessories, or a combination therein. The set of second accessory devices 126 are located in the outer cowl 82 upstream of the HP compressor 26 or the combustion section 28 and can be located downstream, upstream, or at least partially axially align with the AGB 110. The set of second accessory devices can include one or more of a fuel pump, lubrication pump, auxiliary oil pump, air compressor, starter, air turbine starter, scavenge pump, fuel control, or permanent magnet alternator. The set of second accessory devices can also include a hydraulic pump, primary lubrication pump, secondary lubrication pump, main fuel pump, fuel boost pump, or rotisserie. Optionally, the set of second accessory devices can include an electrical generator.

In operation, air flows through the fan section 18 to an inlet 128 that is defined by the fan assembly 20. Airflow exiting the fan section 18 through the inlet 128 enters a bifurcated airflow path. The bifurcated airflow path includes a first portion or first airflow 130 through the engine core 44 and second portion or second airflow 132 that passes through a secondary airflow path 134. Therefore, the inlet 128 can be fluidly coupled to the engine core 44 and the secondary airflow path 134.

The first airflow 130 is channeled into the LP compressor 24 where it is pressurized (hereinafter referred to as "a pressurized airflow 130"), which then supplies the pressurized airflow 130 to the HP compressor 26, which further pressurizes the pressurized airflow 130. The pressurized airflow 130 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the turbine engine 10 via the exhaust section 38. The driving of the LP turbine 36 drives the LP spool 50 to rotate the fan assembly 20 and the LP compressor 24.

A portion of the pressurized airflow 130 can be drawn from the compressor section 22 as bleed air 136. The bleed air 136 can be drawn from the pressurized airflow 130 and provided to engine components requiring cooling. The temperature of pressurized airflow 130 entering the combustor 30 is significantly increased. As such, cooling provided by the bleed air 136 is necessary for operating of such engine components in the heightened temperature environments.

The second airflow 132 travels through the secondary airflow path 134 defined by the inner cowl 76 and the outer cowl 82. That is, the outside face 78 of the inner cowl 76 and the inner surface 86 of the outer cowl 82 can define the secondary airflow path 134.

The second airflow 132 bypasses the LP compressor 24 and the engine core 44 and exits the turbine engine 10. The secondary airflow path 134 can include a stationary vane row, and more particularly the outlet guide vane assembly 45, that includes a plurality of airfoil guide vanes 138. More specifically, a circumferential row of radially extending airfoil guide vanes 138 are utilized adjacent the fan section 18 to exert some directional control of the second airflow 132.

Some of the air supplied by the fan assembly 20 can bypass the engine core 44 and be used for cooling of portions, especially hot portions, of the turbine engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

As the LP spool 50 or the HP spool 48 rotate, rotational energy is provided to the TGB 90 by one or more shafts 92. The TGB 90 provides rotational output to the first accessory device 94 and the connection assembly 104. The connection assembly 104 then rotates one or more portions of the AGB 110, which is operably coupled to the second accessory device 126.

Figure 2:
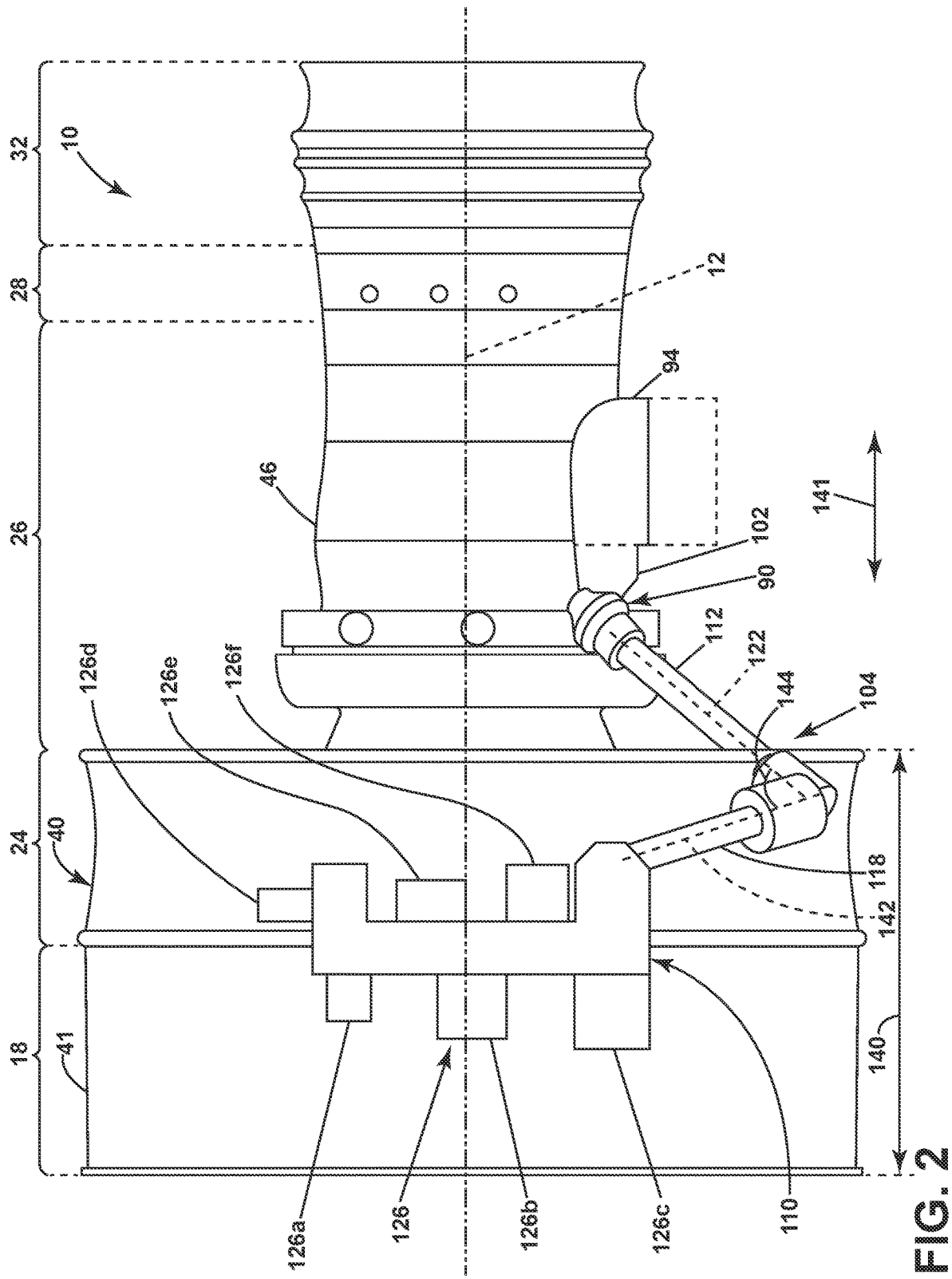
FIG. 2 is a side partial perspective view of the selected components of the turbine engine of FIG. 1, further illustrating the transfer gearbox, the accessory gearbox, and the connecting assembly according to aspects of the present disclosure.

FIG. 2 is a schematic perspective of the turbine engine 10 wherein the outer cowl 82, the inner cowl 76, and the strut 88 (FIG. 1) are removed for ease of understanding.

The second accessory device 126 is illustrated as a set of second accessory devices 126a, 126b, 126c, 126d, 126e, 126f operably coupled to the AGB 110. It is contemplated that a subset of the set of second accessory devices 126a, 126b, 126c, 126d, 126e, 126f can be mounted to an exterior 41 of the fan casing 40 located at the inner surface 86 of the outer cowl 82 (FIG. 1). The set of second accessory devices 126a, 126b, 126c, 126d, 126e, 126f can be axially located in one or more of the fan section 18 or the LP compressor 24 (FIG. 1). That is, the set of second accessory devices 126a, 126b, 126c, 126d, 126e, 126f are upstream of the combustion section 28 and the turbine section 32 (FIG. 1). Further, the set of second accessory devices 126a, 126b, 126c, 126d, 126e, 126f can be upstream of the HP compressor 26 (FIG. 1).

An axial fan length 140 can be measured along the turbine engine axis of rotation 12 in the axial direction illustrated by an arrow 141.

As illustrated by way of example, the first accessory device 94 can be larger than each accessory device in the set of second accessory devices 126a, 126b, 126c, 126d, 126e, 126f.

The first transfer shaft 112 extending from the TGB 90 operably couples to the second transfer shaft 118. A second shaft centerline 142 and the first shaft centerline 122 intersect defining a second angle or a transfer shaft angle 144. While the transfer shaft angle 144 can have any angle measure, it is contemplated that the transfer shaft angle 144 is a non-zero angle. It is further contemplated that the transfer shaft angle 144 can be greater than 0° and less than 180°. More specifically, the transfer shaft angle 144 can be equal to or between 20° and 130°.

While illustrated as the first transfer shaft 112 and the second transfer shaft 118, additional transfer shafts are contemplated. That is, the connection assembly 104 can include two or more shafts that couple the TGB 90 to the AGB 110, such that the TGB 90 is located at the core casing 46 and the AGB 110 located at the fan casing 40.

FIG. 3 is a schematic cross-section of the turbine engine 10 taken along the line III-III of FIG. 1. The first accessory device 94 is located radially between the core casing 46 and the inside face 80 of the inner cowl 76. As illustrated, by way of example, the first accessory device 94 and the TGB 90 are located below the turbine engine axis of rotation 12 adjacent the strut 88, wherein the strut 88 can be a lower strut. Optionally, an upper strut 150 couples the inner cowl 76 and the outer cowl 82. While illustrated as 180° between the strut 88 and the upper strut 150, any angle or number is contemplated. Further, any number of struts coupling the inner cowl 76 and the outer cowl 82 and downstream of the outlet guide vane assembly 45 are contemplated.

The first accessory device 94 is illustrated, by way of example, as having an oval cross section, however any cross-sectional shape is contemplated. By way of non-limiting example, the first accessory device 94 cross-sectional shape can be rectangular, trapezoidal, circular, regular polygon, irregular polygon, or any combination thereof.

The first accessory device 94 is operably coupled to the TGB 90 located axially upstream of the first accessory device 94. The first transfer shaft 112 is illustrated as extending through the strut 88 and into the outer cowl 82.

As illustrated, by way of example, the transfer shaft angle 144 between the first shaft centerline 122 and the second shaft centerline 142 can be measured at the first interface 114, the second interface 116, or the intersection of the first interface 114 and the second interface 116.

The first interface 114, the second interface 116, and the AGB 110 are located upstream of the first accessory device 94 and are therefore represented in dotted lines. The AGB 110 is radially located between the outer surface 84 and the inner surface 86 of the outer cowl 82.

Figure 4:
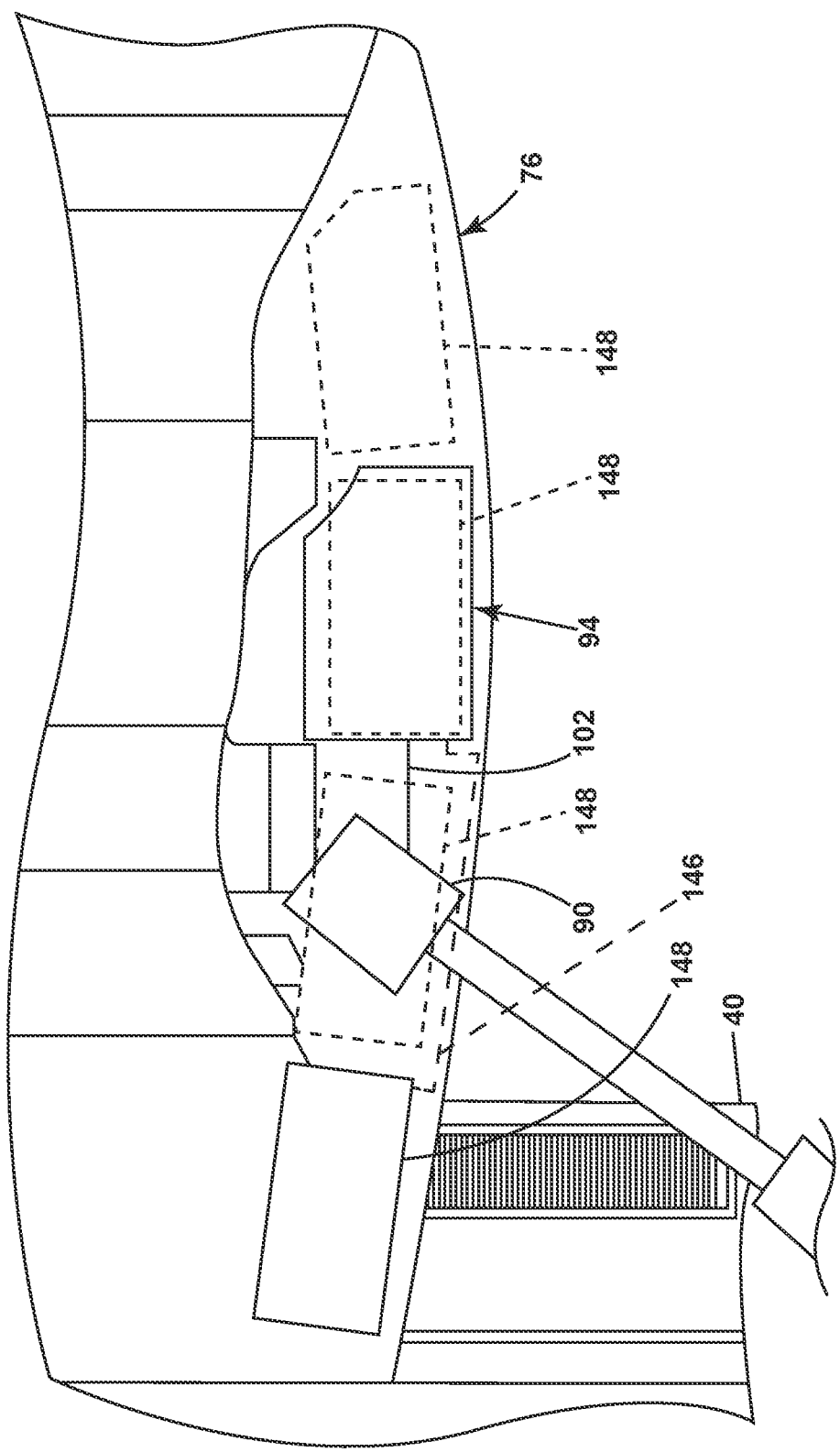
FIG. 4 is an enlarged schematic side view of selected components of the turbine engine of FIG. 2, according to aspects of the present disclosure.

FIG. 4 is a schematic illustration of an enlarged portion of the turbine engine 10. The first accessory device 94 couples to the TGB 90 by means of intermediate members in the transition region 102.

The first accessory device 94 can be an electrical generator or other aircraft or engine accessory requiring cooling. A heat exchanger 148 operably coupled to the first accessory device 94 can be located upstream of the TGB 90. The heat exchanger 148 can be radially located within the inner cowl 76. At least a portion of the heat exchanger 148 can axially overlap a portion of the fan casing 40. The heat exchanger 148 can be in communication with the first accessory device 94 via at least one line 146, wherein the at least one line 146 is a conduit, tubing, piping, wiring, or other known fluid or electrical connection.

Alternatively, and illustrated by dotted lines, in a different non-limiting example, the heat exchanger 148 can be located axially upstream of the first accessory device 94 and radially offset from the TGB 90. That is, a portion of the heat exchanger 148 can at least partially axially align with the TGB 90.

Alternatively, and illustrated by dotted lines, in a different non-limiting example, the heat exchanger 148 can be located radially offset and at least partially axially aligned with the first accessory device 94. Alternatively, in another different non-limiting example, the heat exchanger 148 can be included in or integrally attached to the first accessory device 94.

Alternatively, and illustrated by dotted lines, different non-limiting examples of the location of the heat exchanger 148 can be radially within the inner cowl 76 and axially downstream of the first accessory device 94.

The heat exchanger 148 can exclusively provide heat dissipation for the first accessory device 94. Alternatively, in a different non-limiting example, the heat exchanger 148 can provide heat dissipation for the first accessory device 94 and other components or accessories.

Further, any number of heat exchangers 148 coupled to the first accessory device 94 and located in the inner cowl 76 or outer cowl 82 (FIG. 1) are contemplated.

Figure 5:
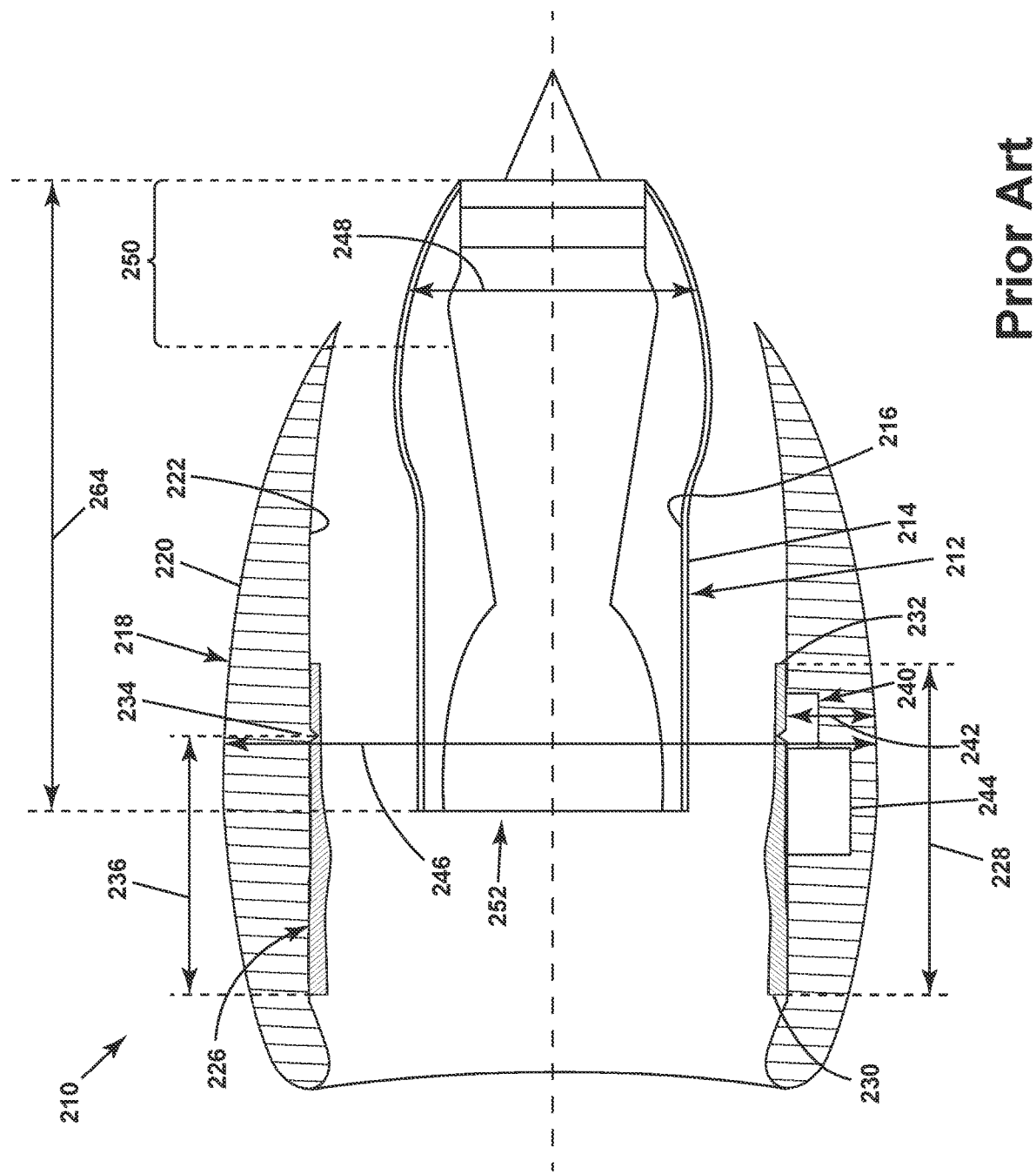
FIG. 5 is a side view of selected components of a turbine engine having an accessory gearbox and at least one accessory.
Figure 6:
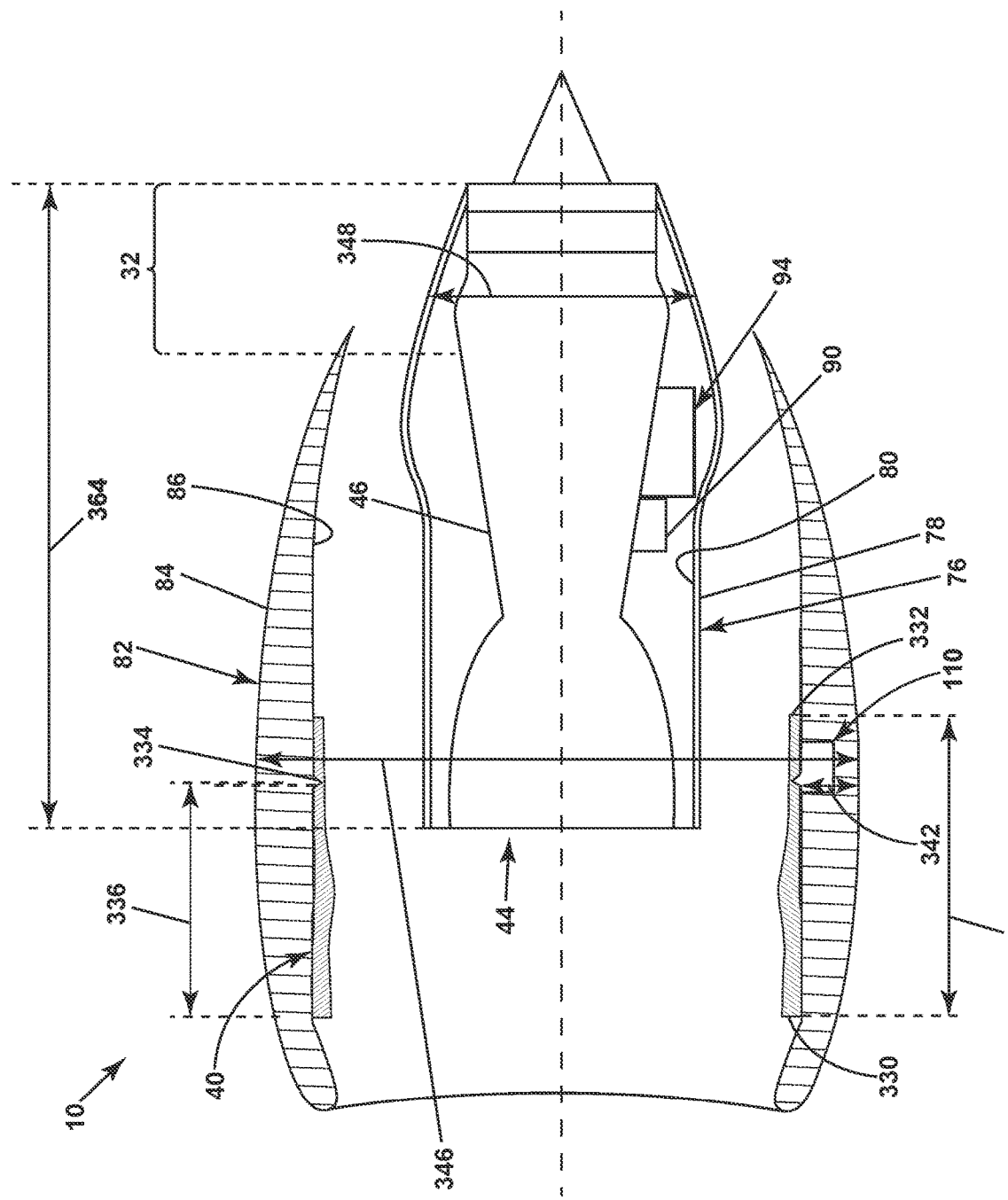
FIG. 6 is a side view of selected components of the turbine engine of FIG. 1 having an accessory gearbox, a transfer gearbox, and at least one accessory, according to aspects of the present disclosure.

FIG. 5 illustrates a turbine engine 210 having a traditional structure where a first accessory device 244 is located in an outer cowl 218. FIG. 5 will be used for comparison to the turbine engine 10 in FIG. 6. In FIG. 6, the turbine engine 10, as disclosed herein, includes the first accessory device 94 located at least partially within the inner cowl 76.

The turbine engine 210 of FIG. 5 includes an inner cowl 212 having an outside face 214 and an inside face 216. The outer cowl 218 includes an outer surface 220 and an inner surface 222 and circumscribes at least a portion of the inner cowl 212.

A fan casing 226 is illustrated contained within the outer cowl 218, having a fan casing length 228. The fan casing length 228 is measured between a leading edge 230 and a trailing edge 232 of the fan casing 226.

A groove 234 is located in the fan casing 226 between the leading edge 230 and the trailing edge 232. A groove distance 236 is measured from the leading edge 230 of the fan casing 226 to the groove 234. The groove 234 can be, for example, a V shaped groove or other interface to the outer cowl 218, although other recess shapes are contemplated.

The first accessory device 244 is operably coupled to an AGB 240 and located in the outer cowl 218. The outer cowl 218 has an outer cowl thickness 242 measured at the AGB 240.

A first accessory device 244 is located in the outer cowl 218 and operably coupled to the AGB 240. The first accessory device 244 can impact the outer cowl thickness 242 due to the size of the first accessory device 244.

An outer cowl span 246 can be measured at the AGB 240 between the outer surfaces 220 of the outer cowl 218. An inner cowl span 248 can be measured between outside faces 214 of the inner cowl 212 at a turbine section 250.

A core length 264 can be defined as the length of an engine core 252.

FIG. 6 illustrates the turbine engine 10 wherein the first accessory device 94 is located downstream of the TGB 90, wherein at least a portion of the first accessory device 94 is within the inner cowl 76.

Figure 7:
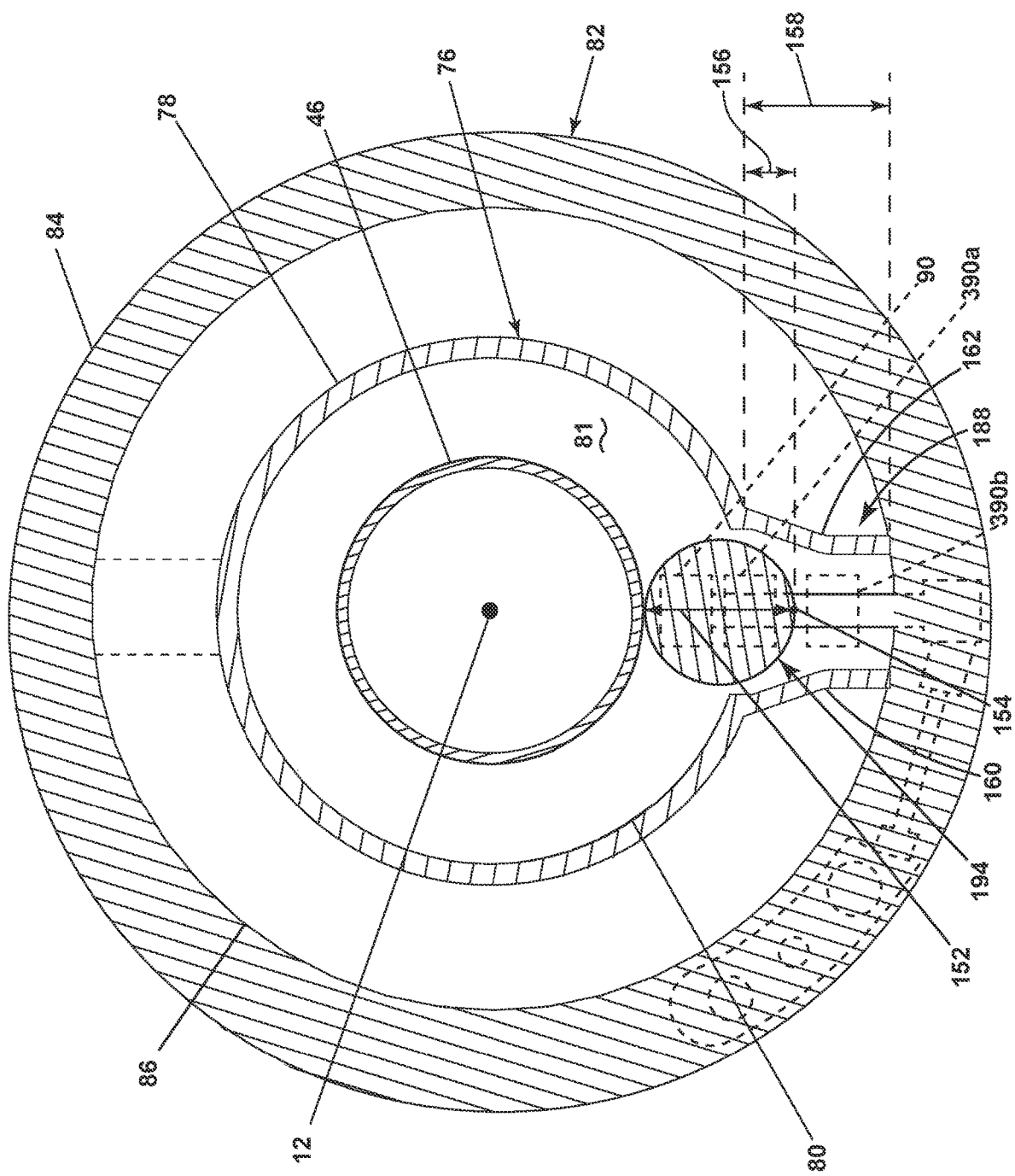
FIG. 7 illustrates a variation of the schematic cross section of FIG. 3, according to aspects of the present disclosure.

Alternatively, in a different and non-limiting example, it is contemplated that the TGB coupled to the first accessory device 94 can be located partially within the inner cowl space 81 and partially within the strut 88, illustrated by a TGB 390a (FIG. 7). In yet another different and non-limiting example, the TGB coupled to the first accessory device 94 can be located within the strut 88, illustrated by a TGB 390b (FIG. 7).

The fan casing 40 having a fan casing length 328 measured between a leading edge 330 and a trailing edge 332 of the fan casing 40.

A groove 334 is located in the fan casing 40 between the leading edge 330 and the trailing edge 332. A groove distance 336 is measured from the leading edge 330 of the fan casing 40 to the groove 334. The groove 334, similar to the groove 234 (FIG. 5), can be, for example, a V-shaped groove or other interface with the outer cowl 82, although other recess shapes are contemplated.

An outer cowl thickness 342 is measured at the AGB 110 between the outer surface 84 and the inner surface 86 of the outer cowl 82. An outer cowl span 346 can be measured at the AGB 110 between the outer surfaces 84 of the outer cowl 82.

An inner cowl span 348 can be measured between the outside faces 78 of the inner cowl 76 at a turbine section 32.

The core length 364 can be defined as the length of the engine core 44.

Referring to FIG. 5 and FIG. 6, the first accessory device 94, being operably coupled to the TGB 90 of the turbine engine 10 provides an aerodynamic benefit when compared to the turbine engine 210.

By way of non-limiting example, the outer cowl thickness 342 of the turbine engine 10 can be smaller or thinner than the outer cowl thickness 242 of the turbine engine 210. The thinner outer cowl thickness of the turbine engine 10 improves aerodynamics, resulting in improved fuel burn. The outer cowl thickness 342 is smaller due to the first accessory device 94 of the turbine engine 10 being located at least partially between the core casing 46 and the inside face 80 of the inner cowl 76. That is, because the first accessory device 94 is not located in the outer cowl 82, the outer cowl thickness 342 of the turbine engine 10 can be smaller than the outer cowl thickness 242 of the turbine engine 210. That is, in at least one location axially along the outer cowl 82, the ratio of the outer cowl thickness 342 of turbine engine 10 to the outer cowl thickness 242 of the turbine engine 210 is less than 1.

It is contemplated that the core length 264 of engine core 252 and the core length 364 of engine core 44 can be equal, while the outer cowl thickness 342 is less than the outer cowl thickness 242. It is contemplated that the outer cowl thickness 342 can be in a range from 0.1% to 40% of the core length 264, 364 less than the outer cowl thickness 242.

The smaller outer cowl thickness 342 in the turbine engine 10 allows for a more aerodynamic outer cowl 82. Further, the smaller outer cowl thickness 342 in the turbine engine 10 can also allow for a more aerodynamic inner cowl 76, better representing or aligning the inner cowl 76 with the shape of the turbine section 32.

The more aerodynamic outer cowl 82 and/or inner cowl 76 improves fuel efficiency. The improved fuel efficiency is especially pronounced when the turbine engine 10 is a geared engine, having a narrower low-pressure turbine (LPT) section diameter (when measured perpendicular to the turbine engine axis). However, improved aerodynamics and fuel efficiency benefits provided by the configuration described herein are also provided to other turbine engines with larger diameter LPT sections, such as a direct drive turbine engine.

By way of non-limiting example, the fan casing length 328 of the fan casing 40 can be less than or equal to the fan casing length 228 of the fan casing 226. By way of further non-limiting example, the fan casing length 328 of the fan casing 40 can be less than the fan casing length 228, where the ratio of the fan casing length 328 of turbine engine 10 to the fan casing length 228 of the turbine engine 210 is less than 1.

By way of non-limiting example, the groove distance 336 of turbine engine 10 can be less than the groove distance 236 of the turbine engine 210. That is, the ratio of the groove distance 336 of turbine engine 10 to the groove distance 236 of the turbine engine 210 is less than 1. In other words, by locating the first accessory device 94 adjacent the core casing 46, the groove distance 336 can be equal to or between 0.5-30% shorter than the groove distance 236 of the turbine engine 210.

The shorter groove distance 336 in the turbine engine 10 allows for the AGB 110 to move closer to a forward portion of the outer cowl 82. This further improves the aerodynamics of the outer cowl 82. The AGB 110 of the turbine engine 10 is at least 1% closer to the leading edge 330 of the fan casing 40 than the AGB 240 of turbine engine 210.

FIG. 7 illustrates a first accessory device 194 and a strut 188, the first accessory device 194 and strut 188 are similar to the first accessory device 94 and strut 88 previously described in FIG. 3. Therefore, like parts will be identified with like numerals increased by 100, and it is understood that the description of like parts of the first accessory device 94 and strut 88 applies to the first accessory device 194 and strut 188, unless otherwise noted.

As illustrated, by way of example, the strut 188 or a portion of the strut 188 can be unitarily formed with the inner cowl 76. One or more portions of the strut 188 can be received or mounted to the outer cowl 82. Alternatively, in another different example, the strut can be coupled to the inner cowl 76 and outer cowl 82.

The first accessory device 194, coupled to the TGB 90, is located radially between the core casing 46 and the inner surface 86 of the outer cowl 82. That is, the first accessory device 194 extends past the inner cowl 76 into the strut 188.

An accessory thickness 152 can be measured radially across the first accessory device 194. The accessory thickness 152 can be measured in a radial direction determined as outward from the turbine axis of rotation 12. Alternatively, the accessory thickness 152 can be measured from a portion of the first accessory device 194 located radially inward of the inside face 80 of the inner cowl 76 to another portion of the first accessory device 194 that is a farthest extent 154 of the first accessory device 194 into the strut 188.

An extension length 156 of the first accessory device 194 can be measured from the outside face 78 of the inner cowl 76 to the farthest extent 154 of the first accessory device 194. A ratio of the accessory thickness 152 to the extension length 156 can be in a range from 100:99 to 100:1.

A cowl distance 158 can be measured between the outside face 78 of the inner cowl 76 and the inner surface 86 of the outer cowl 82. A ratio of the cowl distance 158 to the extension length 156 can be in a range from 100:99 to 100:1.

Strut sidewalls 160 can include at least one contour or bend 162. The bend 162 can be adjacent or accommodate the portion of the first accessory device 194 extending into the strut 188. While illustrated as having a curvature and a bend, any number or combination of geometric structures are contemplated such that the strut sidewalls 160 can receive the portion of the first accessory device 194 extending into the strut 188.

Even with contours in the strut sidewalls 160 that extend into the secondary airflow path 134 (FIG. 1), locating the first accessory device 194 in the inner cowl 76 and a portion of the strut 88 provides improved aerodynamics over turbine engine 210 (FIG. 5).

Figure 8:
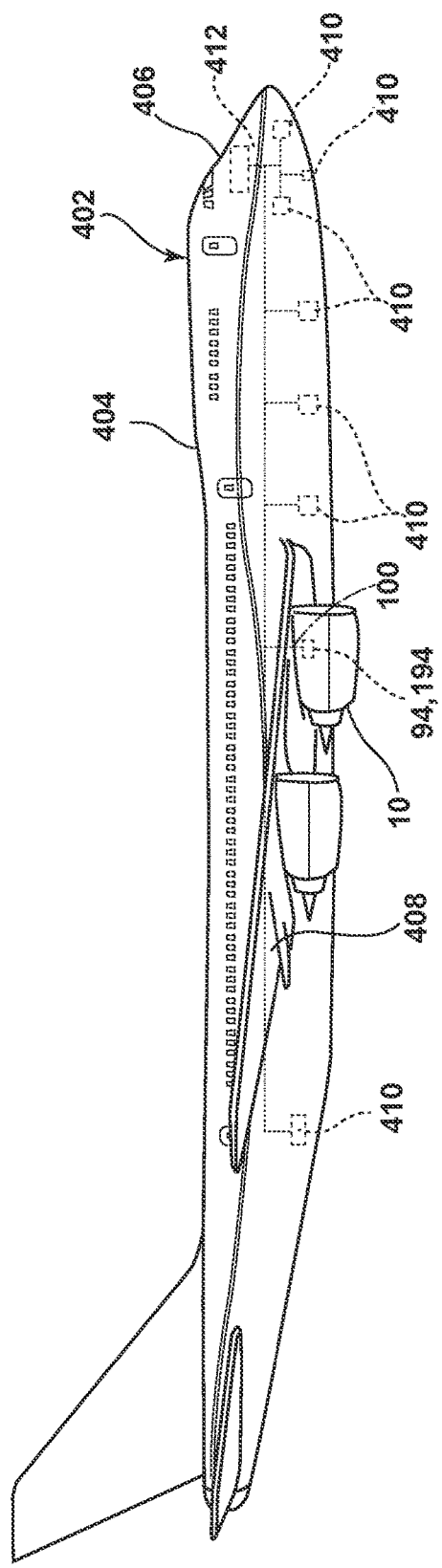
FIG. 8 illustrates an aircraft having the turbine engine of FIG. 1, according to aspects of the present disclosure.

FIG. 8 illustrates an aircraft 402 that provides an environment for aspects of the disclosure. The aircraft 402 includes the turbine engine 10 coupled to a fuselage 404. A cockpit 406 can be positioned in the fuselage 404 and wing assemblies 408 can extend outwardly from the fuselage 404.

Further, a set of aircraft systems 410 that enable operation of the aircraft 402 can be included as well as a controller or computer 412. The set of aircraft systems 410 can reside within the fuselage 404, the cockpit 406, within the electronics and equipment bay (not shown), as well as in other locations throughout the aircraft 402 including aircraft accessories or engine accessories. Such aircraft systems 410 can include, but are not limited to, an electrical system, an oxygen system, hydraulics or pneumatics system, a fuel system, a propulsion system, FMS, flight controls, audio/video systems, an Integrated Vehicle Health Management (IVHM) system, and systems associated with the mechanical structure of the aircraft 402.

As illustrated, by way of example, the first accessory device 94, 194 of the turbine engine 10 can be in communication with one or more aircraft systems 410 or portions of the aircraft 402. The first accessory device 94, 194 can provide, for example, electrical power, hydraulic pressure, or other required power or material to one or more aircraft systems 410.

The first accessory device 94, 194 can communicate with one or more aircraft systems 410 via the communication line 100. The communication line 100 can carry, by way of non-limiting example, electrical power.

Benefits of aspects of the disclosure include improved fuel burn. The core mounted accessory device allows for a more aerodynamic outer cowl. That is, because a portion of the first accessory device is between the core casing and outer cowl instead of located in the outer cowl, the inner and outer cowls can be smaller and/or more streamlined or aerodynamic. The improved airflow through the cowls improves fuel efficiency.

Benefits of locating the first accessory device at least partially within the inner cowl (instead of in the outer cowl) reduces the length of the communication line to aircraft systems. Shortening the communication line can reduce weight carried by the aircraft. Further, shortening the communication line will have a material savings.

Additional benefits include a shorter V-groove distance between the forward portion of the outer cowl and the AGB. Moving the AGB forward of the fan casing further improves the aerodynamics of at least the outer cowl, thereby further improving fuel efficiency.

Coupling the heat exchanger in the engine core adjacent or integrated with the first accessory device allows for shorter piping which can result in benefits such as a weight savings.

The configuration of the AGB in the outer cowl provides a cooler environment for the operation of the AGB and attached accessories. While the inner cowl is a warmer environment, a temperature benefit can be had by locating the TGB and attached accessory or accessories upstream of the combustion section and/or extending into the strut upstream of the combustion section.

Moving the first accessory device from the outer cowl to the between the core casing and the inner cowl, or between the core casing and extending into the strut can also provide room to add additional components, such as, but not limited to, reverse thruster components and/or a slim line nacelle fan cowl.

Therefore, aspects of the disclosure simultaneously improve fuel burn by facilitating a tight aerodynamic cowl line package around the engine core and fan while also providing improved maintenance access. Maintenance access is improved when the accessory gearbox is located with a majority of the accessories at the fan cowl or the outer cowl. However, by locating a small subset of accessories (including just one accessory) within the inner cowl space and/or the strut as opposed to the fan cowl or the outer cowl; fuel burn is improved as the cowl line packaging of the fan cowl or outer cowl is leaner. Therefore, the invention provides the unexpected result or providing both improved maintenance access by locating the accessory gearbox and a majority of the accessories at the fan cowl or the outer cowl, while improving fuel burn by selecting one or more larger accessories to be located inside the inner cowl, the strut, or combination thereof.

Further aspects of the disclosure are provided by the subject matter of the following clauses:

A turbine engine comprising a fan section, a compressor section, a combustion section, and a turbine section in axial flow arrangement and defining a turbine engine axis of rotation, wherein the compressor section comprises a low-pressure compressor and a high-pressure compressor, a core defined by the compressor section, the combustion section, and the turbine section, an inner cowl circumscribing at least a portion of the engine core and radially spaced from the engine core to define an inner cowl space, an outer cowl circumscribing at least a portion of the inner cowl and spaced from the inner cowl, and a transfer gearbox at least partially located in the inner cowl space, a first accessory device at least partially located in the inner cowl space and operably coupled to the transfer gearbox, wherein the first accessory device is located upstream of the combustion section, an accessory gearbox located in the outer cowl and operably coupled to the transfer gearbox, and a second accessory device operably coupled to the accessory gearbox and located in the outer cowl, wherein the second accessory is upstream of the high-pressure compressor.

The turbine engine of any of the preceding clauses, further comprising a connection assembly operably coupling the accessory gearbox to the transfer gearbox, the connection assembly comprising at least a first transfer shaft and a second transfer shaft.

The turbine engine of any of the preceding clauses, wherein the first transfer shaft has a first shaft centerline forming a first angle from the turbine engine axis of rotation when viewed from a plane containing both the first shaft centerline and the turbine engine axis, wherein the first angle is greater than 0° and less than 90°.

The turbine engine of any of the preceding clauses, wherein the second transfer shaft has a second shaft centerline forming a second angle from the first shaft centerline when viewed from a plane containing both the second shaft centerline and the first shaft centerline, wherein the second angle is greater than 0° and less than 180°.

The turbine engine of claim any of the preceding clauses, further comprising a strut extending between the inner cowl and the outer cowl, wherein the strut has a hollow interior and a first transfer shaft extends from the transfer gearbox, through the hollow interior, and into the outer cowl.

The turbine engine of claim any of the preceding clauses, wherein a portion of the first accessory device extends past the inner cowl into the strut.

The turbine engine of any of the preceding clauses, wherein the first accessory device includes an accessory thickness measured radially across the first accessory device, and an extension length measured from an outside face of the inner cowl to a farthest extent of the first accessory device, wherein a ratio of the accessory thickness to the extension length is in a range from 100:99 to 100:1.

The turbine engine of any of the preceding clauses, wherein the strut is defined, at least in part, by strut sidewalls, wherein at least one strut sidewall of the strut sidewalls includes at least one contour or bend.

The turbine engine of any of the preceding clauses, wherein the at least one contour or bend accommodates the portion of the first accessory device extending into the strut.

The turbine engine of any of the preceding clauses, wherein the first accessory device is an aircraft accessory.

The turbine engine of any of the preceding clauses, wherein the first accessory device is an electrical generator located downstream of the fan section.

The turbine engine of any of the preceding clauses, further comprising a heat exchanger located radially located within the inner cowl space and upstream of the first accessory device.

The turbine engine of any of the preceding clauses, further comprising a heat exchanger located radially within the inner cowl space and axially aligned or integrally formed with the first accessory device.

The turbine engine of any of the preceding clauses, wherein the first accessory device is a set of first accessory devices that include one or more of an electrical generator, a hydraulic pump, primary lubrication pump, secondary lubrication pump, aircraft permanent magnet alternator, main fuel pump, fuel boost pump, fuel pump, air turbine starter, or rotisserie.

The turbine engine of any of the preceding clauses, wherein the set of first accessory devices includes at least three accessory devices, wherein the at least three accessory devices are aircraft accessories, engine accessories, or a combination thereof.

The turbine engine of any of the preceding clauses, wherein the second accessory device is a set of second accessory devices including one or more of a fuel pump, a lubrication pump, an air compressor, an air turbine starter, a scavenge pump, a fuel control, a permanent magnet alternator, auxiliary oil pump, starter, a hydraulic pump, primary lubrication pump, secondary lubrication pump, main fuel pump, fuel boost pump, or rotisserie.

The turbine engine of any of the preceding clauses, wherein at least a subset of the set of second accessory devices are located upstream of the accessory gearbox.

The turbine engine of any of the preceding clauses, wherein the fan section includes fan blades rotatable about the turbine engine axis of rotation and circumscribed by a fan casing defined, in part, by the outer cowl, wherein the accessory gearbox and the second accessory device are coupled to an exterior of the fan casing.

The turbine engine of any of the preceding clauses, wherein the second accessory device axially overlaps at least a portion of the fan blades.

The turbine engine of any of the preceding clauses, wherein the second accessory device axially overlaps the fan casing.

The turbine engine of any of the preceding clauses, wherein the first accessory device is an electrical generator located downstream of the fan section.

The turbine engine of any of the preceding clauses, further comprising a high-pressure shaft or a low-pressure shaft within the engine core, wherein one or more shafts operably couple the transfer gearbox to the high-pressure shaft or the low-pressure shaft.

The turbine engine of any of the preceding clauses, wherein the first accessory device is a hydraulic pump located downstream of the fan section.

A turbine engine, comprising a fan section, a compressor section, a combustion section, and a turbine section in axial flow arrangement and defining a turbine engine axis of rotation, wherein the combustion section comprises a low-pressure compressor and a high-pressure compressor, a core defined by the compressor section, the combustion section, and the turbine section, an inner cowl circumscribing at least a portion of the engine core and radially spaced from the engine core to define an inner cowl space, an outer cowl circumscribing at least a portion of the inner cowl and spaced from the inner cowl, and a transfer gearbox axially located downstream of the fan section, a first accessory device at least partially located in the inner cowl space and operably coupled to the transfer gearbox, wherein the first accessory device is located upstream of the combustion section, an accessory gearbox located in the outer cowl and operably coupled to the transfer gearbox, and a second accessory device operably coupled to the accessory gearbox and located in the outer cowl, wherein the second accessory is upstream of the high-pressure compressor.

The turbine engine of any of the preceding clauses, wherein the outer cowl includes an outer surface and an inner surface, wherein the transfer gearbox located radially within the inner surface of the outer cowl.

The turbine engine of any of the preceding clauses, wherein the transfer gearbox is partially located within the inner cowl space.

The turbine engine of any of the preceding clauses, further comprising a strut extending between the inner cowl and the outer cowl, wherein the strut has a hollow interior and the transfer gearbox is at least partially located within the hollow interior of the strut.

The turbine engine of any of the preceding clauses, further comprising a strut extending between the inner cowl and the outer cowl, wherein the strut has a hollow interior and the transfer gearbox is located within the hollow interior of the strut.

The turbine engine of any of the preceding clauses, further comprising a connection assembly operably coupling the accessory gearbox to the transfer gearbox, the connection assembly comprising at least a first transfer shaft, a first interface, a second interface, and a second transfer shaft.

The turbine engine of any of the preceding clauses, further comprising a strut extending between the inner cowl and the outer cowl, wherein the strut has a hollow interior and the first transfer shaft, the first interface, and the second interface are at least partially located within the hollow interior of the strut.

What is claimed is:

1. A turbine engine comprising:
a fan section, a compressor section, a combustion section, and a turbine section in axial flow arrangement and defining a turbine engine axis of rotation, wherein the compressor section comprises a low-pressure compressor and a high-pressure compressor;
an engine core defined by the compressor section, the combustion section, and the turbine section;
an inner cowl circumscribing at least a portion of the engine core and radially spaced from the engine core to define an inner cowl space;
an outer cowl circumscribing at least a portion of the inner cowl and spaced from the inner cowl;
a transfer gearbox at least partially located in the inner cowl space;
a first accessory device at least partially located in the inner cowl space and operably coupled to the transfer gearbox, wherein the first accessory device is located upstream of the combustion section;
an accessory gearbox located in the outer cowl;
a connection assembly operably coupling the accessory gearbox to the transfer gearbox, the connection assembly comprising:
a first transfer shaft extending from the transfer gearbox to a first interface, the first transfer shaft having a first shaft centerline forming a first angle from the turbine engine axis of rotation when viewed from a plane containing both the first shaft centerline and the turbine engine axis of rotation, wherein the first angle is greater than 0° and less than 90°; and
a second transfer shaft extending from the accessory gearbox and coupled to a second interface rotatably driven by the first interface, wherein the second transfer shaft includes a second shaft centerline forming a second angle from the first shaft centerline when viewed from a plane containing both the second shaft centerline and the first shaft centerline, wherein the second angle is greater than 0° and less than 180°;
a second accessory device operably coupled to the accessory gearbox and located in the outer cowl, wherein the second accessory device is upstream of the combustion section; and
a heat exchanger located radially within the inner cowl space, wherein at least a portion of the heat exchanger axially overlaps a portion of a fan casing.

2. The turbine engine of claim 1, further comprising a strut extending between the inner cowl and the outer cowl, wherein the strut has a hollow interior and a first transfer shaft extends from the transfer gearbox, through the hollow interior, and into the outer cowl.

3. The turbine engine of claim 2, wherein a portion of the first accessory device extends past the inner cowl into the strut.

4. The turbine engine of claim 3, wherein the first accessory device includes an accessory thickness measured radially across the first accessory device, and an extension length measured from an outside face of the inner cowl to a farthest extent of the first accessory device, wherein a ratio of the accessory thickness to the extension length is in a range from 100:99 to 100:1.

5. The turbine engine of claim 3, wherein the strut is defined, at least in part, by strut sidewalls, wherein at least one strut sidewall of the strut sidewalls includes at least one contour or bend.

6. The turbine engine of claim 5, wherein the at least one contour or bend accommodates the portion of the first accessory device extending into the strut.

7. The turbine engine of claim 1, wherein the first accessory device is an aircraft accessory.

8. The turbine engine of claim 7, wherein the first accessory device is an electrical generator located downstream of the fan section.

9. The turbine engine of claim 1, wherein the heat exchanger is upstream of the first accessory device.

10. The turbine engine of claim 1, wherein the first accessory device is a set of first accessory devices that include one or more of an electrical generator, a hydraulic pump, primary lubrication pump, secondary lubrication pump, aircraft permanent magnet alternator, main fuel pump, fuel boost pump, fuel pump, air turbine starter, or rotisserie.

11. The turbine engine of claim 10, wherein the set of first accessory devices includes at least three accessory devices, wherein the at least three accessory devices are aircraft accessories, engine accessories, or a combination thereof.

12. The turbine engine of claim 1, wherein the second accessory device is a set of second accessory devices including one or more of a fuel pump, a lubrication pump, an air compressor, an air turbine starter, a scavenge pump, a fuel control, a permanent magnet alternator, auxiliary oil pump, starter, a hydraulic pump, primary lubrication pump, secondary lubrication pump, main fuel pump, fuel boost pump, or rotisserie.

13. The turbine engine of claim 12, wherein at least a subset of the set of second accessory devices are located upstream of the accessory gearbox.

14. The turbine engine of claim 1, wherein the fan section includes fan blades rotatable about the turbine engine axis of rotation and circumscribed by a fan casing defined, in part, by the outer cowl, wherein the accessory gearbox and the second accessory device are coupled to an exterior of the fan casing.

15. The turbine engine of claim 14, wherein the second accessory device axially overlaps the fan casing.

16. The turbine engine of claim 15, wherein the first accessory device is an electrical generator located downstream of the fan section.

17. The turbine engine of claim 1, wherein the transfer gearbox and the accessory gearbox are circumferentially spaced.

18. The turbine engine of claim 1, wherein the first interface rotatably couples to the second interface on the outer cowl.

19. The turbine engine of claim 1, further comprising at least one additional heat exchanger.

20. The turbine engine of claim 1, wherein the heat exchanger is in communication with the first accessory device via at least one line, wherein the at least one line is a conduit, tubing, piping, wiring, or other known fluid or electrical connection.

* * * * *

UNITED STATES PATENT AND TRADEMARK OFFICE
CERTIFICATE OF CORRECTION

PATENT NO. : 12,215,629 B2
APPLICATION NO. : 18/184937
DATED : February 4, 2025
INVENTOR(S) : John Carl Glessner et al.

Page 1 of 1

It is certified that error appears in the above-identified patent and that said Letters Patent is hereby corrected as shown below:

In the Claims

Column 18, Claim 18, Line 54, "on the outer cowl" should be "in the outer cowl."

Signed and Sealed this
Thirtieth Day of September, 2025

John A. Squires
*Director of the United States Patent and Trademark Office*